(12) United States Patent
Sun et al.

(10) Patent No.: US 12,206,597 B2
(45) Date of Patent: Jan. 21, 2025

(54) METHOD AND APPARATUS FOR CONFIGURING QUALITY OF SERVICE POLICY FOR SERVICE, AND COMPUTING DEVICE (71) Applicant: HUAWEI TECHNOLOGIES CO., LTD., Guangdong (CN)

(72) Inventors: Keyong Sun, Shenzhen (CN); Lei Xiao, Shenzhen (CN); Hongwei Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/747,234

(22) Filed: May 18, 2022

(65) Prior Publication Data
US 2022/0286409 A1 Sep. 8, 2022

Related U.S. Application Data (63) Continuation of application No. PCT/CN2020/121714, filed on Oct. 17, 2020.

(30) Foreign Application Priority Data

Nov. 19, 2019 (CN) .......................... 201911138148.0
Dec. 31, 2019 (CN) .......................... 201911403653.3

(51) Int. Cl.
*H04L 47/80* (2022.01)
*G06F 9/455* (2018.01)
(Continued)

(52) U.S. Cl.
CPC ........ *H04L 47/805* (2013.01); *G06F 9/45533* (2013.01); *H04L 41/0823* (2013.01);
(Continued)

(58) Field of Classification Search
CPC ... H04L 47/805; H04L 47/2425; H04L 47/24; H04L 47/2483; H04L 41/0823;
(Continued)

(56) References Cited

U.S. PATENT DOCUMENTS 8,954,962 B2 * 2/2015 Malik .................. H04L 12/4641 718/1
9,886,296 B2 * 2/2018 Clark .................. H04L 41/5029
(Continued)

FOREIGN PATENT DOCUMENTS

CN 1535520 A 10/2004
CN 1812365 A 8/2006
(Continued)

OTHER PUBLICATIONS

Extended European Search Report issued in EP20889808.0, dated Jun. 21, 2022, 7 pages.
(Continued)

*Primary Examiner* — Redentor Pasia (57) ABSTRACT

This application provides a method and apparatus for configuring a quality of service policy for a service, and a computing device, and belongs to the field of network communications technologies. The method includes: obtaining a first data flow forwarded by a virtual switch; determining service information of the first data flow, where the service information includes a service type of the first data flow and an access path of the first data flow; determining, based on the service information of the first data flow, a quality of service QoS policy matching the first data flow; and configuring devices on the access path based on the matched QoS policy. According to this application, efficiency of configuring a quality of service policy for a service can be improved.

14 Claims, 7 Drawing Sheets (51) Int. Cl.
*H04L 41/0823* (2022.01)
*H04L 41/0894* (2022.01)
*H04L 41/5003* (2022.01)
*H04L 47/24* (2022.01)
*H04L 47/2425* (2022.01)
*H04L 49/00* (2022.01)

(52) U.S. Cl.
CPC ...... *H04L 41/0894* (2022.05); *H04L 41/5003* (2013.01); *H04L 47/24* (2013.01); *H04L 47/2425* (2013.01); *H04L 49/70* (2013.01)

(58) Field of Classification Search
CPC . H04L 41/0894; H04L 41/5003; H04L 49/70; H04L 45/70; G06F 9/45533; G06F 9/45558
See application file for complete search history.

(56) References Cited

U.S. PATENT DOCUMENTS

| | | | |
|---|---|---|---|
| 10,433,203 | B1 | 10/2019 | Kothari et al. |
| 2002/0045453 | A1 | 4/2002 | Juttner et al. |
| 2010/0232441 | A1 | 9/2010 | Verma et al. |
| 2014/0169788 | A1* | 6/2014 | Hussain .................. H04L 12/00 398/43 |
| 2014/0269273 | A1* | 9/2014 | Cors ....................... H04L 49/70 370/230 |
| 2015/0033222 | A1* | 1/2015 | Hussain .................. H04L 49/70 718/1 |
| 2015/0180776 | A1* | 6/2015 | DeCusatis ........... H04L 12/4641 370/392 |
| 2016/0359912 | A1* | 12/2016 | Gupta .................... G06F 21/53 |
| 2017/0163487 | A1* | 6/2017 | Wang .................. G06F 9/45558 |
| 2017/0353433 | A1* | 12/2017 | Antony .................. H04L 49/70 |
| 2018/0048537 | A1* | 2/2018 | Gaikwad ............. H04L 41/0896 |
| 2018/0101398 | A1* | 4/2018 | Barabash ............ H04L 41/5003 |
| 2018/0331958 | A1* | 11/2018 | Lee ........................ H04W 72/54 |
| 2019/0260658 | A1* | 8/2019 | Gell ..................... H04L 67/1097 |
| 2020/0007398 | A1* | 1/2020 | Gaikwad ............. H04L 41/0894 |
| 2021/0218642 | A1* | 7/2021 | Pasupathy ........... H04L 47/2425 |
| 2022/0255848 | A1* | 8/2022 | Bajaj ...................... H04L 41/16 |

FOREIGN PATENT DOCUMENTS

| | | |
|---|---|---|
| CN | 101572719 A | 11/2009 |
| CN | 101867580 A | 10/2010 |
| CN | 101888334 A | 11/2010 |
| CN | 103095836 A | 5/2013 |
| CN | 104301251 A | 1/2015 |
| CN | 105207787 A | 12/2015 |
| CN | 105577546 A | 5/2016 |
| CN | 108494588 A | 9/2018 |
| CN | 111245740 A | 6/2020 |
| EP | 2830270 A1 | 1/2015 |
| KR | 20160041631 A | 4/2016 |
| WO | 2011130471 A2 | 10/2011 |

OTHER PUBLICATIONS

Office Action issued in CN201911403653.3, dated May 17, 2021, 8 pages.
Office Action issued in CN201911403653.3, dated Dec. 1, 2021, 5 pages.
International Search Report and Written Opinion issued in PCT/CN2020/121714, Jan. 7, 2021, 11 pages.

* cited by examiner

METHOD AND APPARATUS FOR CONFIGURING QUALITY OF SERVICE POLICY FOR SERVICE, AND COMPUTING DEVICE

CROSS-REFERENCE TO RELATED APPLICATIONS

This application is a continuation of International Application No. PCT/CN2020/121714, filed on Oct. 17, 2020, which claims priority to Chinese Patent Application No. 201911403653.3, filed on Dec. 31, 2019, and Chinese Patent Application No. 201911138148.0, filed on Nov. 19, 2019. All of the aforementioned patent applications are hereby incorporated by reference in their entireties.

TECHNICAL FIELD

This application relates to the field of network communications technologies, and in particular, to a method and apparatus for configuring a quality of service policy for a service, and a computing device.

BACKGROUND

With development of network technologies, a cloud network includes a virtual network and physical network resources in a data center, and provides network services for the data center, so that a host in the data center can flexibly communicate with a host outside the data center and another host in the data center. In this way, access to a service deployed on a host can be implemented between the hosts.

In a related technology, to access a service in the data center, a plurality of different devices usually need to be passed through. To ensure quality of service of the service, a quality of service (QoS) policy for the service is manually set on the devices through which a data flow of the service passes. In this way, when the data flow of the service is transmitted on the devices, the data flow may be processed based on the QoS policy, to ensure quality of service of the service.

In the related technology, the QoS policy for the service is manually set on the devices through which the data flow of the service passes. In this case, when there are a large quantity of services, or the data flow of the service passes through a large quantity of devices, a large amount of time is consumed.

SUMMARY

This application provides a method and apparatus for configuring a quality of service policy for a service, and a computing device, to reduce time for configuring the quality of service policy for the service when a data flow of the service passes through a large quantity of devices.

According to a first aspect, this application provides a method for configuring a quality of service policy for a service, where the method includes: obtaining a first data flow forwarded by a virtual switch; determining service information of the first data flow, where the service information includes a service type of the first data flow and an access path of the first data flow; determining, based on the service information of the first data flow, a QoS policy matching the first data flow; and configuring devices on the access path based on the matched QoS policy.

In the solution provided in this application, the method for configuring a quality of service policy for a service may be executed by a configuration apparatus. When an application in a virtual machine of a host (which may be referred to as a target host) needs to perform a service, the virtual machine may generate a data flow (which may be referred to as a first data flow subsequently) of the service. Then, the virtual machine transmits the first data flow to a virtual switch of the host. Alternatively, when an application in a virtual machine of another host needs to perform a service, and access a target host, the virtual machine may generate a data flow (which may be referred to as a first data flow in the following) of the service, and transmit the first data flow to a virtual switch of the target host. The virtual switch transmits the first data flow to a service identification engine of the configuration apparatus. The configuration apparatus may identify the first data flow, to determine a service type of the first data flow and an access path of the first data flow. The configuration apparatus may determine, based on the service type of the first data flow, a QoS policy matching the first data flow. Then, the configuration apparatus can configure devices on the access path of the first data flow based on the QoS policy matching the first data flow. Subsequently, the devices on the access path of the first data flow may process the first data flow based on configuration of the first data flow. In this way, for any service, devices on an access path can be configured by the configuration apparatus without manual configuration. Therefore, efficiency of configuring a QoS policy for the service can be improved.

In an example implementation, a source identifier and a destination identifier of the first data flow are determined based on 5-tuple information in the first data flow. The access path of the first data flow is determined based on a stored network topology of the host to which the virtual switch belongs, the source identifier, and the destination identifier.

In the solution provided in this application, the configuration apparatus may identify a header in the first data flow, and obtain the 5-tuple information from the header. The configuration apparatus obtains the source identifier (including a source Internet Protocol (Internet Protocol, IP) address and a source port number) and the destination identifier (including a destination IP address and a destination port number) of the first data flow from the 5-tuple information. Then, the configuration apparatus obtains a stored network topology of the target host. In the network topology, the configuration apparatus corresponds the source identifier of the first data flow to a source device of the first data flow in the network topology, and corresponds the destination identifier of the first data flow to a destination device of the first data flow in the network topology. Then, the configuration apparatus may determine a path from the source device to the destination device based on the source device and the destination device, where the path is the access path of the first data flow. In this way, the access path of the first data flow can be accurately determined.

In an example implementation, a service level agreement (Service Level Agreement, SLA) corresponding to the service type of the first data flow is determined based on a stored correspondence between service types and SLAs. The QoS policy matching the first data flow is determined based on the SLA corresponding to the service type.

In the solution provided in this application, the configuration apparatus may obtain the stored correspondence between the service types and the SLAs, and determine, from the correspondence, the SLA corresponding to the service type of the first data flow. Then, the configuration apparatus may convert the SLA into a QoS policy, where the QoS policy is the QoS policy matching the first data flow. In this way, the QoS policy matching the first data flow may be obtained.

In an example implementation, a QoS sub-policy corresponding to each device on the access path of the first data flow is determined based on the QoS policy matching the first data flow. Each device on the access path is configured based on the QoS sub-policy corresponding to the device.

In the solution provided in this application, the configuration apparatus may determine, based on the QoS policy matching the first data flow, the QoS sub-policy corresponding to each device on the access path of the first data flow. Subsequently, the configuration apparatus configures each device on the access path based on the QoS sub-policy corresponding to the device. In this way, the QoS sub-policy of each device on the access path is determined, to better ensure quality of service of the service.

In an example implementation, the determining, based on the QoS policy matching the first data flow, a QoS sub-policy corresponding to each device on the access path of the first data flow includes: obtaining a monitoring indicator of each device on the access path, where the monitoring indicator includes one or more of central processing unit (Central Processing Unit/Processor, CPU) usage, memory usage, a packet loss ratio, and a transmission latency; determining a key device in the devices on the access path based on the monitoring indicator of each device, where the key device is a device that processes a data flow slowest on the access path; determining a QoS sub-policy of the key device based on a minimum requirement of each indicator in the matched QoS policy; and determining the matched QoS policy as a QoS sub-policy of a device other than the key device on the access path.

In the solution provided in this application, the configuration apparatus may obtain the monitoring indicator of each device on the access path of the first data flow, where the monitoring indicator includes one or more of the CPU usage, the memory usage, the packet loss ratio, and the transmission latency. The CPU usage is CPU usage of the device in a latest periodicity. The memory usage is memory usage of the device in the latest periodicity. The packet loss ratio is a packet loss ratio of the device in the latest periodicity (a quantity of lost data packets is obtained by subtracting a quantity of data packets that are sent from the device from a quantity of data packets entering the device in the periodicity, and the packet loss ratio is obtained by dividing the quantity of lost data packets by the quantity of data packets entering the device). The transmission latency is a transmission latency (an average value of durations used by packets from entering the device to exiting the device in the latest periodicity) of the device in the latest periodicity. Then, the configuration apparatus determines the key device in the devices on the access path based on the monitoring indicator of each device. Then, the configuration apparatus determines the minimum requirement of each indicator in the QoS policy matching the first data flow, and determines the QoS sub-policy of the key device based on the minimum requirement. In addition, the configuration apparatus may determine the QoS policy matching the first data flow, and determine the QoS policy as a QoS sub-policy of a device other than the key device in the devices on the access path of the first data flow. In this way, a QoS sub-policy may be determined corresponding to each device on the access path.

In an example implementation, the method includes: obtaining a disappearance message that is of the first data flow and sent by the virtual switch, or determining, based on 5-tuple information of a data flow forwarded by the virtual switch, that the data flow forwarded by the virtual switch does not include the first data flow; and canceling configuration of the devices on the access path of the first data flow based on the QoS policy matching the first data flow.

In the solution provided in this application, after receiving the disappearance message of the first data flow from the virtual switch of the target host, the configuration apparatus may obtain an identifier of the first data flow by parsing the disappearance message, and may determine that the data flow forwarded by the virtual switch does not include the first data flow. Alternatively, the configuration apparatus obtains the 5-tuple information of the data flow forwarded by the virtual switch. If the 5-tuple information does not include 5-tuple information of the first data flow, the configuration apparatus determines that the data flow forwarded by the virtual switch does not include the first data flow.

Then, the configuration apparatus may cancel the configuration of the devices on the access path of the first data flow based on the QoS policy matching the first data flow. In this way, storage space of a device can be saved.

In an example implementation, the method includes: obtaining an addition message that is of the first data flow and sent by the virtual switch, or determining, based on the 5-tuple information of the data flow forwarded by the virtual switch, that the first data flow is added to the original data flow forwarded by the virtual switch.

In the solution provided in this application, after receiving the addition message of the first data flow from the virtual switch of the target host, the configuration apparatus may obtain an identifier of the first data flow by parsing the addition message, and may determine that the data flow forwarded by the virtual switch includes the first data flow. Alternatively, the configuration apparatus obtains the 5-tuple information of the data flow forwarded by the virtual switch. If the 5-tuple information of the first data flow is newly added to the 5-tuple information, the configuration apparatus determines that the first data flow is newly added to the data flow forwarded by the virtual switch. In this way, a newly added data flow may be determined in time, and devices on an access path of the data flow are configured based on a QoS policy matching the data flow.

According to a second aspect, this application provides an apparatus for configuring a quality of service policy for a service. The apparatus includes a plurality of modules, and the plurality of modules perform the method according to the first aspect by executing instructions.

According to a third aspect, this application provides a computing device. The computing device includes a memory and a processor, and the processor executes computer instructions stored in the memory, so that the computing device is enabled to perform the method according to the first aspect.

According to a fourth aspect, this application provides a non-volatile readable computer storage medium, where the computer storage medium stores a computer program, and when the computer program is executed by a computing device, the method according to the first aspect is implemented.

According to a fifth aspect, this application provides a computer program product, where the computer program product includes computer instructions, and when the computer instructions are executed by a computing device, the computing device is enabled to perform the method according to the first aspect.

The technical solutions provided in this application include at least the following beneficial effects:

In this application, the configuration apparatus may determine, based on a data flow, an access path and a QoS policy that matches the data flow. Then, the configuration apparatus configures devices on the access path based on the QoS policy matching the data flow. In this way, for any service, devices on an access path can be configured in this manner without manual configuration. Therefore, efficiency of configuring a QoS policy for the service can be improved.

DESCRIPTION OF EMBODIMENTS

To make objectives, technical solutions, and advantages of this application clearer, the following further describes implementations of this application in detail with reference to accompanying drawings.

For ease of understanding of embodiments of this application, the following first describes concepts of some related nouns.

Figure 1:
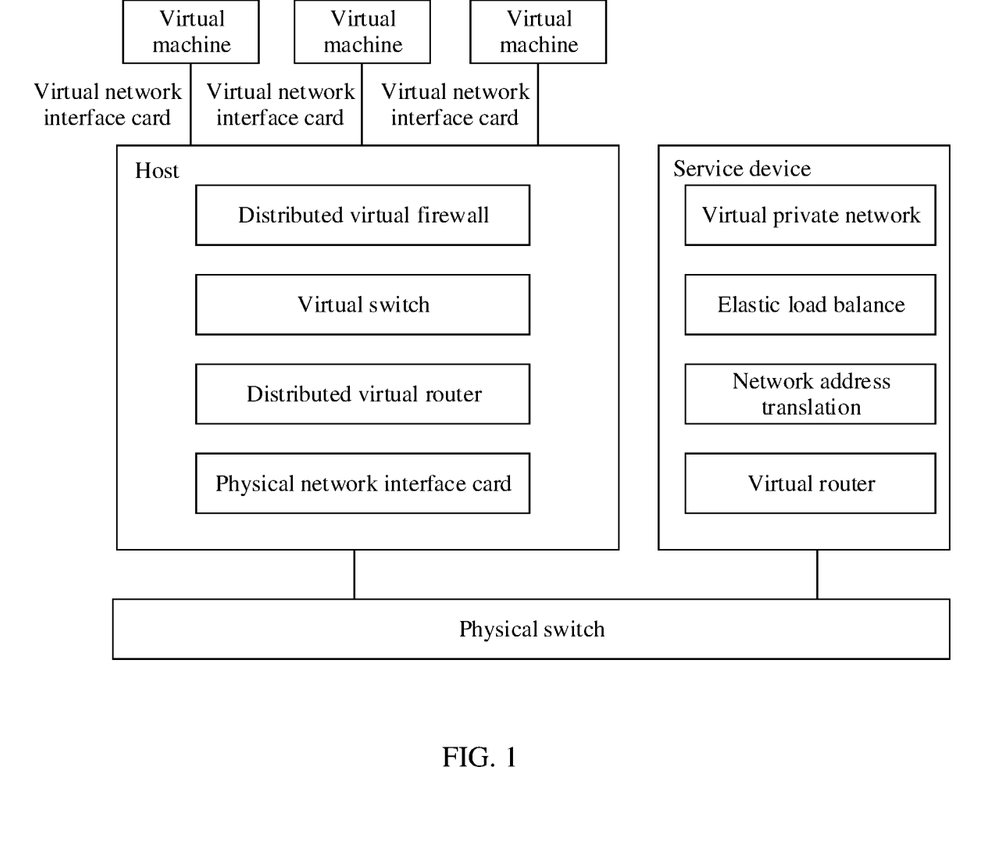
FIG. 1 is s schematic diagram of a structure of a cloud network according to an embodiment of this application.

A cloud network includes a virtual network and physical network resources in a data center. A general diagram of a structure of a cloud network is shown in FIG. 1. The cloud network includes hosts, a plurality of devices (which may be referred to as service devices) that provide services, and a plurality of physical switches. The services provided by the service devices include but are not limited to a virtual private network (VPN) service, an elastic load balance (ELB) service, a network address translation (NAT) service, a virtual router service, and the like. Each host is connected to a physical switch, and each host is connected to a service device through the physical switch. A plurality of virtual machines (the virtual machine may be any virtualized virtual machine) are mounted to the host, and the plurality of virtual machines implement network communication by using virtual network interface cards (vNICs). The host includes a distributed firewall (DFW), a virtual switch, a distributed virtual router (DVR), a physical network interface card (pNIC), and the like. It should be noted herein that only one host, one service device, and one physical switch are shown herein, but embodiments are not limited thereto.

In a related technology, to ensure quality of service of a service, a QoS policy for the service is manually set on devices through which a data flow of the service passes. When there are a large quantity of services, or the data flow of the service passes through a large quantity of devices, a large amount of time is consumed in setting up the QoS policy for the service. In addition, after a virtual machine is migrated, an access path of a data flow of a service on the virtual machine also changes accordingly. However, a change of the access path of the data flow of the service cannot be found manually in time. Even if the change of the access path is found manually in time, a QoS policy for the service needs to be manually configured on a changed access path, and this leads to a low configuration efficiency. Therefore, an efficient method for configuring a QoS policy for a service needs to be provided.

Figure 2:
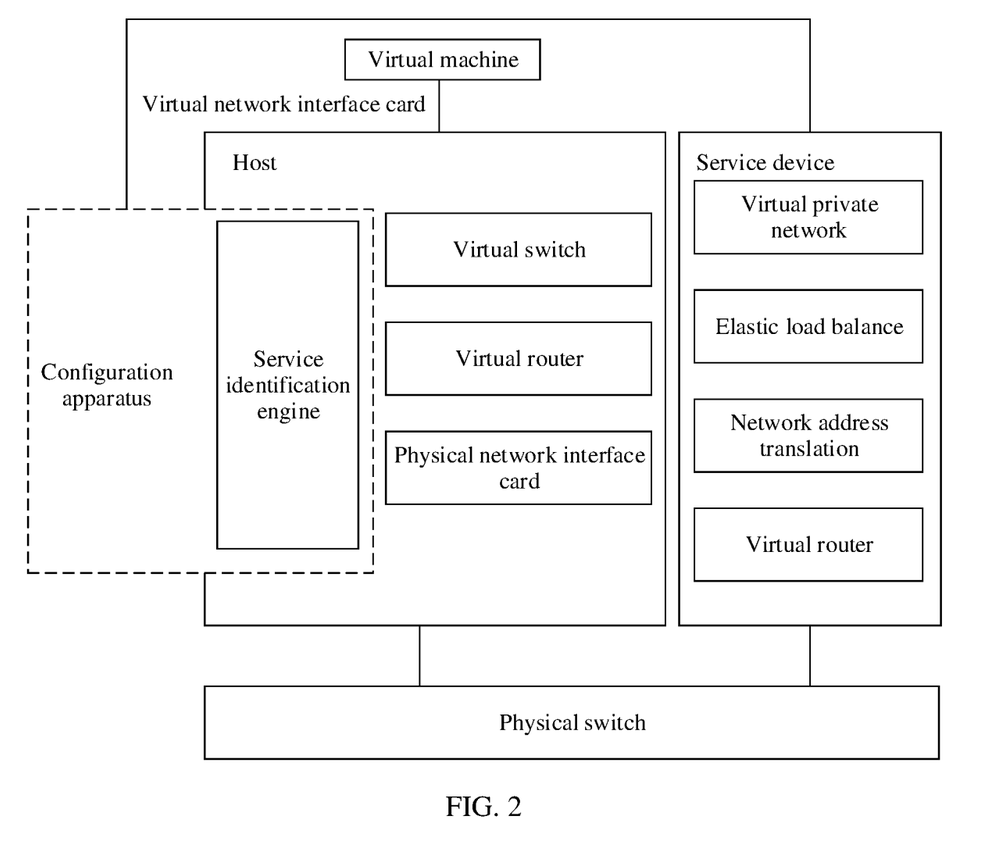
FIG. 2 is a schematic diagram of a structure of setting a configuration apparatus in a cloud network according to an embodiment of this application.
Figure 3:
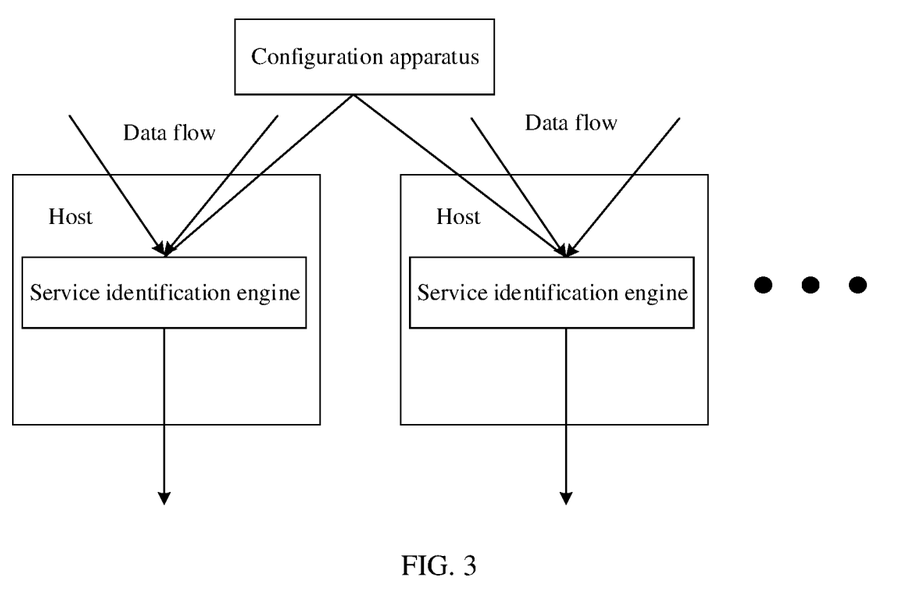
FIG. 3 is a schematic diagram of a structure of setting a configuration apparatus in a cloud network according to an embodiment of this application.

This application provides a method for configuring a QoS policy for a service. The method may be executed by a QoS policy configuration apparatus (which may be referred to as a configuration apparatus for short in the following). As shown in FIG. 2, the configuration apparatus establishes a communications connection to the host in FIG. 1, and a communications connection to the device in FIG. 1 that provides a service such as an ELB service. The configuration apparatus may be a hardware device, for example, a computing device, or may be software, for example, a program deployed on a computing device. It should be noted herein that only one host is shown in FIG. 2, but embodiments are not limited thererto. Actually, the configuration apparatus may manage a plurality of hosts, and a process (which may be referred to as a service identification engine) is disposed on each host to identify a data flow of a service, as shown in FIG. 3.

In an example implementation, when the configuration apparatus is a hardware device, a process (which may be referred to as a service identification engine) is disposed on a host, and the configuration apparatus obtains, through the process, a data flow transmitted by the host. In addition, the configuration apparatus may obtain a service type of the data flow and a source end and a destination end of the data flow through the process.

In an example implementation, when the configuration apparatus is software, the configuration apparatus may be deployed on a computing device and a host. A part deployed on the host is a process (which may be referred to as a service identification engine). The process is configured to obtain a data flow transmitted by the host, and determine a service type of the data flow and a source end and a destination end of the data flow. A part deployed on the computing device may be configured to determine a QoS policy (which is described in the following) of the data flow based on content determined by the process.

It should be noted that the service identification engine obtains, in a plurality of manners, the data flow transmitted by the host, and the following shows two feasible manners.

Figure 4:
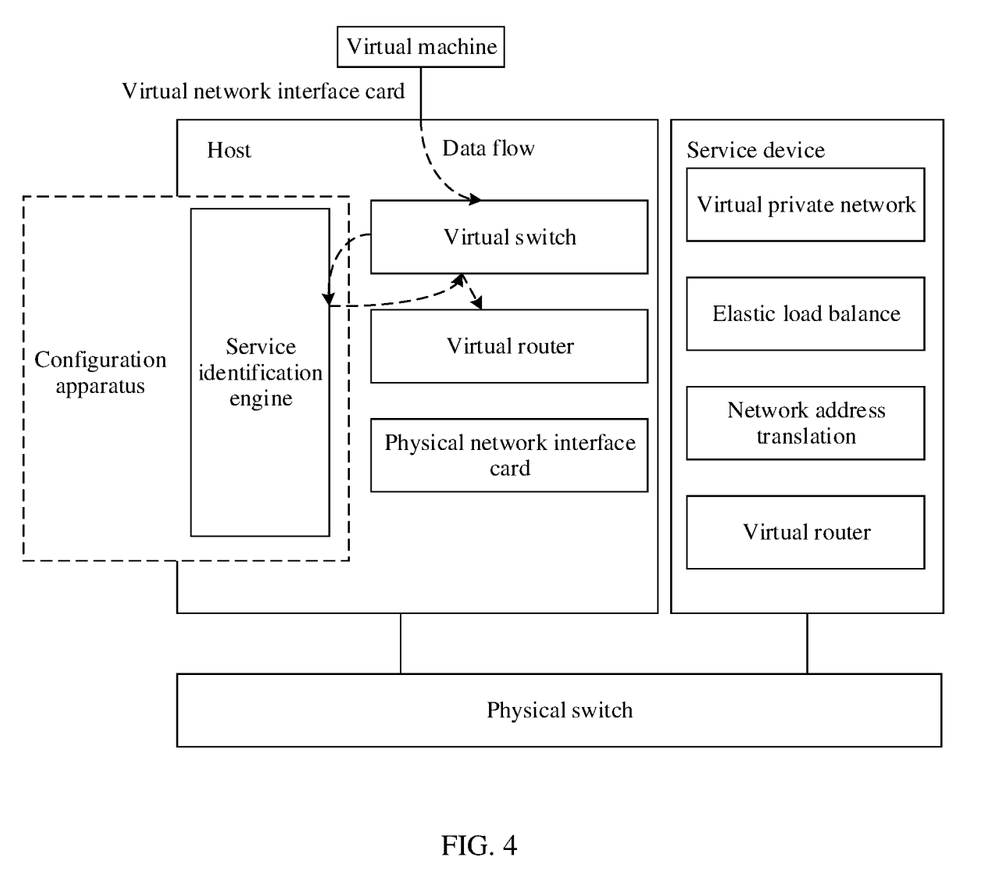
FIG. 4 is a schematic diagram of transmission of a data flow according to an embodiment of this application.

Manner 1: As shown in FIG. 4, when the data flow transmitted by the host passes through a virtual switch of the host, the virtual switch of the host transmits the data flow to the service identification engine. After obtaining the data flow, the service identification engine identifies the data flow to determine the service type of the data flow and the source end and the destination end of the data flow. The service identification engine then transmits the data flow to the virtual switch, and the virtual switch continues to perform subsequent processing (the subsequent processing is the same as the processing of the virtual switch in the related technology). It should be noted herein that, to prevent the virtual switch of the host from retransmitting the received service data flow that is of the service and transmitted by the service identification engine to the service identification engine, the service identification engine may use the data flow to carry an identifier when transmitting the data flow to the virtual switch, where the identifier is used to indicate that the data flow can be processed subsequently, instead of being transmitted to the service identification engine.

Figure 5:
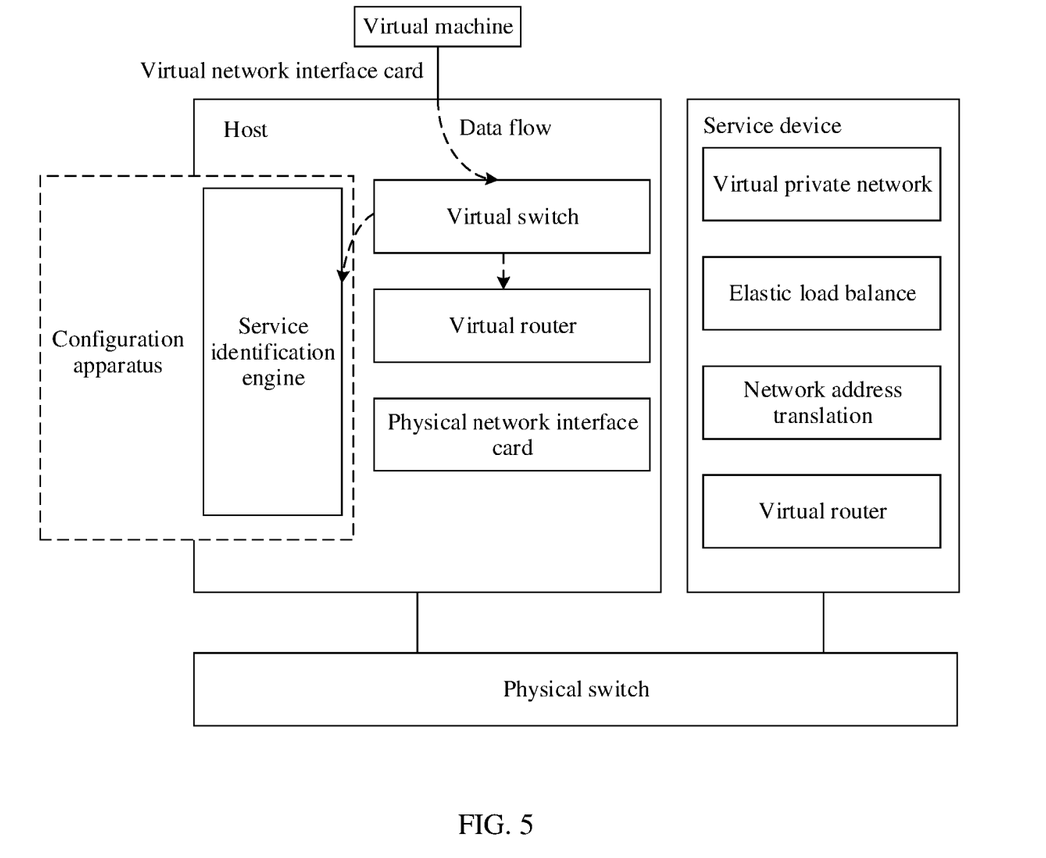
FIG. 5 is a schematic diagram of transmission of a data flow according to an embodiment of this application.

Manner 2: As shown in FIG. 5, when the data flow transmitted by the host passes through the virtual switch, the virtual switch duplicates the data flow, performs a normal processing procedure on the original data flow, and transmits a duplicated data flow to the service identification engine. After receiving the duplicated data flow, the service identification engine identifies the data flow to determine the service type of the data flow and the source end and the destination end of the data flow. Then, the service identification engine deletes the data flow.

In addition, for Manner 1 and Manner 2, each time the virtual switch receives a data flow, the virtual switch establishes a flow table or updates a flow table (in a case of establishing a flow table, a flow table corresponding to the data flow is newly established if no flow table corresponding to the data flow is currently stored; in a case of updating a flow table, only time of a flow table corresponding to the data flow may be updated to current time if the flow table corresponding to the data flow is stored). To reduce repeated work of the service identification engine, the virtual switch may send only the data flow corresponding to the newly established flow table to the service identification engine, and does not send, to the service identification engine, the data flow whose corresponding flow table is already stored. In this way, for a same service, the service identification engine may process a data flow only once.

It should be noted that the flow table may include 5-tuple information of the data flow, and the 5-tuple information is a source Internet Protocol (IP) address, a destination IP address, a source port number, a destination port number, and a protocol number.

Figure 6:
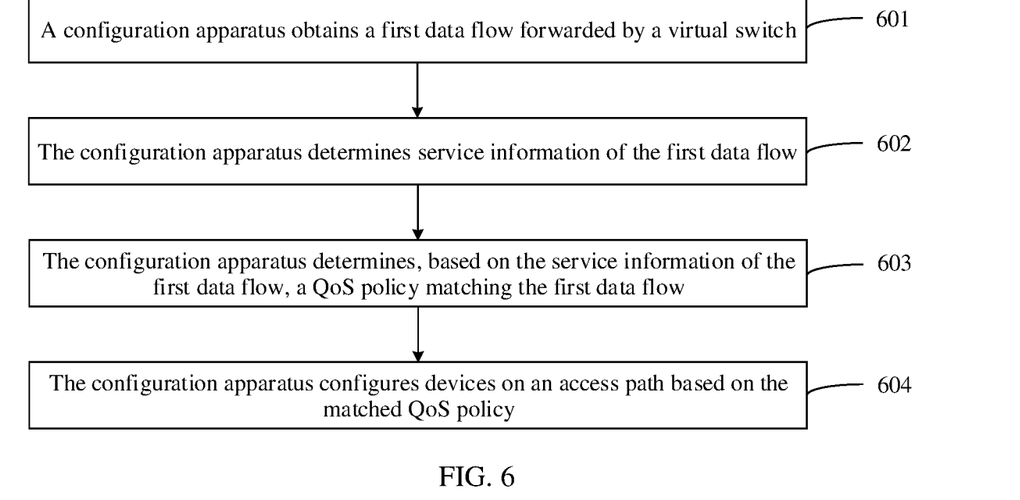
FIG. 6 is a schematic flowchart of a method for configuring a quality of service policy for a service according to an embodiment of this application.

The following describes a procedure of the method for configuring a QoS policy for a service with reference to FIG. 6 (the foregoing Manner 1 is used as an example for description in this embodiment).

Step 601: The configuration apparatus obtains a first data flow forwarded by the virtual switch.

The first data flow is any data flow forwarded by the virtual switch.

In this embodiment, when an application in a virtual machine of a host (for example, a target host) needs to perform a service, the virtual machine may generate a data flow (which may be referred to as a first data flow in the following) of the service. Then, the virtual machine transmits the first data flow to the virtual switch of the target host. Alternatively, when an application in a virtual machine of another host needs to perform a service, and access a target host, the virtual machine may generate a data flow (which may be referred to as a first data flow in the following) of the service, and transmit the first data flow to a virtual switch of the target host.

In the foregoing two manners, the virtual switch of the target host may receive the first data flow, and it determines whether a flow table corresponding to the first data flow is stored. If a determining result is that the flow table corresponding to the first data flow is stored, time of the flow table is updated to current time; or if a determining result is that no flow table corresponding to the first data flow is stored, the flow table corresponding to the first data flow is established. The virtual switch transmits the first data flow to the service identification engine of the configuration apparatus. In this way, the configuration apparatus obtains the first data flow through the service identification engine.

In an example implementation, the service identification engine is a netfilter to which a hook is added, and is configured to obtain a data flow.

Step 602: The configuration apparatus determines service information of the first data flow.

For any data flow, service information of the data flow includes a service type of the data flow and an access path of the data flow. Each data flow corresponds to a service type. The service type is used to indicate a type of the data flow to be processed. The service type includes a mail type, a web page service type, a file transfer type, an office system type, a voice service type, and the like. The access path of the data flow is a path including all devices that the data flow passes through from a source end to a destination end.

In this embodiment, the configuration apparatus may identify the first data flow, to determine a service type of the service information of the first data flow and an access path of the first data flow.

In an example implementation, when the first data flow is an encrypted data flow, if the service identification engine obtains a password, the service identification engine may decrypt the first data flow and perform subsequent processing. If the service identification engine fails to obtain the password, the service identification engine may enter the first data flow into a preset service type identification model, to obtain the service type of the first data flow. The preset service identification model may be a service type identification model obtained through training based on various data flows for which service types are calibrated.

Step 603: The configuration apparatus determines, based on the service information of the first data flow, a QoS policy matching the first data flow.

The QoS policy includes one or more of a network bandwidth requirement for the service, a latency requirement for the service, or a packet loss requirement for the service. For example, the network bandwidth requirement may be a network bandwidth range, and indicates that a minimum bandwidth of the service cannot be lower than a minimum value of the network bandwidth range, and a maximum bandwidth of the service cannot be higher than a maximum value of the network bandwidth range. The latency requirement may be a latency threshold, and indicates that a latency of the data flow cannot exceed the latency threshold. The packet loss requirement may be a packet loss ratio threshold, and indicates that a packet loss ratio of the data flow cannot exceed the packet loss ratio threshold.

In this embodiment, after identifying the service information of the first data flow, the configuration apparatus may determine, based on the service type of the first data flow, the QoS policy matching the first data flow.

Step 604: The configuration apparatus configures devices on the access path based on the matched QoS policy.

In this embodiment, the configuration apparatus may configure the devices on the access path of the first data flow based on the QoS policy matching the first data flow. Subsequently, the devices on the access path of the first data flow may process the first data flow based on configuration of the first data flow.

In this way, in this embodiment of this application, the configuration apparatus may determine, based on the data flow, the access path and the QoS policy that matches the data flow. Then, the configuration apparatus configures the devices on the access path based on the QoS policy matching the data flow. In this way, for any service, devices on an access path can be configured in this manner without manual configuration. Therefore, efficiency of configuring a QoS policy for the service can be improved.

In an example implementation, in the foregoing processing in step 602, a manner for determining the service type of the first data flow by the configuration apparatus may be as follows:

The configuration apparatus may identify the first data flow according to a Network Layer 7 Protocol (that is, an Application Layer Protocol), to recognize the Application Layer Protocol corresponding to the first data flow. Then, the configuration apparatus obtains the service type of the first data flow based on a correspondence between the application layer protocol and the service type. For example, the application layer protocol is an HTTP Protocol, and the service type may be a web page service type.

In an example implementation, in the foregoing processing in step 602, a manner for determining the access path of the first data flow by the configuration apparatus may be as follows:

The configuration apparatus determines a source identifier and a destination identifier of the first data flow based on 5-tuple information in the first data flow, and determines the access path of the first data flow based on a stored network topology of the host to which the virtual switch belongs, the source identifier, and the destination identifier.

In this embodiment, the configuration apparatus identifies a header in the first data flow, and obtains the 5-tuple information from the header. The configuration apparatus obtains the source identifier (including a source IP address and a source port number) and the destination identifier (including a destination IP address and a destination port number) of the first data flow from the 5-tuple information. Then, the configuration apparatus obtains the stored network topology of the host to which the virtual switch belongs. In the network topology, the configuration apparatus corresponds the source identifier of the first data flow to a source device of the first data flow in the network topology, and corresponds the destination identifier of the first data flow to a destination device of the first data flow in the network topology. Then, the configuration apparatus may determine a path from the source device to the destination device based on the source device and the destination device, where the path is the access path of the first data flow.

Specifically, a process of determining the path from the source device to the destination device by the configuration apparatus is as follows:

A network topology records a host on which a virtual machine is located, a virtual switch bound to a virtual network interface card of the virtual machine, a physical network interface card connected to the virtual switch, a port of a physical switch connected to the physical network interface card, and an interconnection relationship between physical switches. When the first data packet of the first data flow is transmitted, each physical switch through which the first data packet passes establishes a forwarding table of the first data packet. In this way, a forwarding table from the source device to the destination device is recorded.

The configuration apparatus finds a physical switch communicating with the virtual switch that forwards the first data flow, and then determines, based on the forwarding table of the first data flow, physical switches through which the first data flow is transmitted to the destination device, to determine the path from the source device to the destination device.

It should be noted herein that, when different data centers are managed by different configuration apparatuses, a configuration apparatus can manage only a data center controlled by the configuration apparatus. Therefore, if the destination device and the source device of the first data flow are in a same data center, the access path of the first data flow that is determined by the configuration apparatus is an access path from the source end to the destination end. If the destination device and the source device of the first data flow are in different data centers, the access path of the first data flow that is determined by the configuration apparatus is actually an access path from the source end to an egress port of a data center in which the source device is located, but does not include an access path from the egress port of the data center to the destination end.

Herein, it should be noted that the interconnection relationship between the physical switches may be obtained by using a Link Layer Discovery Protocol (LLDP) or a Simple Network Management Protocol (SNMP).

Herein, it should be noted that if the configuration apparatus is a network management device, the configuration apparatus stores the network topology and the forwarding table of the first data flow. If the configuration apparatus is not a network management device, the configuration apparatus may obtain the network topology and the forwarding table of the first data flow from a network management device.

In an example implementation, in step 603, a manner of determining the QoS policy matching the first data flow may be as follows:

The configuration apparatus determines, based on a stored correspondence between service types and SLAs, an SLA corresponding to the service type of the first data flow, and determines, based on the SLA corresponding to the service type, the QoS policy matching the first data flow.

Different service types correspond to different SLAs, and a QoS policy may be determined based on an SLA. For example, the service type is a file transfer type, and the SLA corresponding to the file transfer type includes: a data amount of data transmitted in a target duration range, a target quantity of data packets that may be lost during transmission of the data amount of data, a longest latency of transmission of the data amount of data that is a target value, and the like.

In this embodiment, a service information center is established in the configuration apparatus, and the service information center stores SLAs corresponding to various service types. Specifically, the service information center may store the SLAs in a manner of the correspondence between the service types and the SLAs.

After determining the service type of the first data flow in step 602, the configuration apparatus may find the SLA corresponding to the service type of the first data flow from the correspondence between the service types and the SLAs. Then, the configuration apparatus converts the SLA into a QoS policy, where the QoS policy is the QoS policy matching the first data flow.

Specifically, when the SLA is converted into the QoS policy, corresponding to the foregoing example, for the SLA corresponding to the file transfer type, maximum and minimum values of a data amount of data transmitted per second may be determined by dividing a data amount of data transmitted in the SLA by maximum and minimum values of the target duration range. The maximum and minimum values of the data amount of data transmitted per second are used as the network bandwidth requirement.

The configuration apparatus obtains a preset size of a data packet, and then divides the data amount in the target duration range by the preset size of the data packet, to obtain a quantity of data packets of the data volume, and then divides the target quantity by the quantity of data packets of the data amount, to obtain the packet loss ratio, that is, the packet loss requirement.

The configuration apparatus obtains the quantity of data packets of the data amount, and then divides the target value by the quantity of data packets of the data amount, to obtain a latency of each data packet, that is, the latency requirement.

Description is provided herein only by using an example in which the service type is the file transfer type. Processing of other service types is similar to the processing of the file transfer type. Details are not described in this embodiment of this application.

It should be noted that, the configuration apparatus may directly store a QoS policy corresponding to each service type. That is, the configuration apparatus converts an SLA corresponding to the service type into the QoS policy in advance, and then stores a correspondence between the service type and the QoS policy. Subsequently, the configuration apparatus may directly obtain the corresponding QoS policy by using the service type. In addition, another device may convert the SLA corresponding to the service type into the QoS policy corresponding to the service type, and the configuration apparatus may obtain the correspondence between the service type and the QoS policy from the another device.

Figure 7:
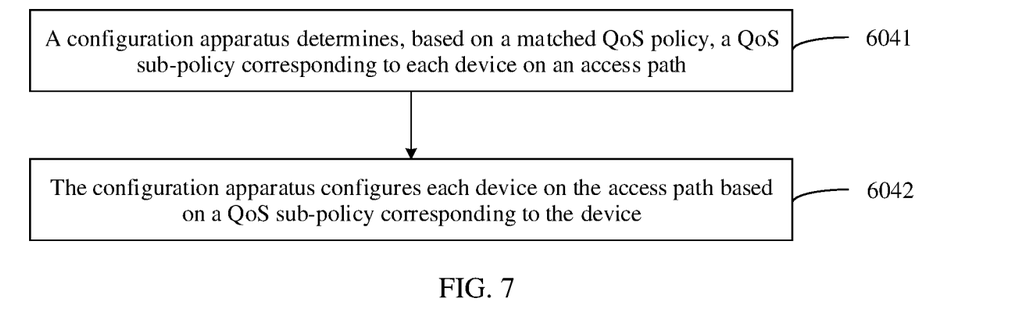
FIG. 7 is a schematic flowchart of determining a QoS sub-policy of each device on an access path according to an embodiment of this application.

In an example implementation, in step 604, an execution procedure may be as shown in FIG. 7.

Step 6041: The configuration apparatus determines, based on the matched QoS policy, a QoS sub-policy corresponding to each device on the access path.

When step 6041 is performed, there may be a plurality of example implementations, and the following provides two example implementations.

Implementation 1: The configuration apparatus obtains a monitoring indicator of each device on the access path, where the monitoring indicator includes one or more of CPU usage, memory usage, a packet loss ratio, and a transmission latency. The configuration apparatus determines a key device in the devices on the access path based on the monitoring indicator of each device. The configuration apparatus determines a QoS sub-policy of the key device based on a minimum requirement of each indicator in the matched QoS policy. The configuration apparatus determines the matched QoS policy as a QoS sub-policy of a device other than the key device on the access path.

In this embodiment, the configuration apparatus is connected to a monitoring device, and the monitoring device collects a monitoring indicator of each device in the network topology. Specifically, each device in the network topology may periodically report a monitoring indicator of the device to the monitoring device. The monitoring indicator includes one or more of CPU usage, memory usage, a packet loss ratio, and a transmission latency. The CPU usage is CPU usage of the device in the network topology in a latest periodicity. The memory usage is memory usage of the device in the network topology in the latest periodicity. The packet loss ratio is a packet loss ratio of the device in the network topology in the latest periodicity (a quantity of lost data packets is obtained by subtracting a quantity of data packets that are sent from the device from a quantity of data packets entering the device in the periodicity, and the packet loss ratio is obtained by dividing the quantity of lost data packets by the quantity of data packets entering the device). The transmission latency is a transmission latency (an average value of durations used by packets from entering the device to exiting the device in the latest periodicity) of the device in the network topology in the latest periodicity.

The configuration apparatus may send an obtaining request for the monitoring indicator to the monitoring device, where the obtaining request carries an identifier of each device on the access path of the first data flow. After receiving the obtaining request, the monitoring device obtains the identifier of the device on the access path of the first data flow by parsing the obtaining request, and finds, by using the identifier, the monitoring indicator corresponding to the device on the access path of the first data flow. The monitoring device sends, to the configuration apparatus, the monitoring indicator corresponding to the device on the access path of the first data flow. The configuration apparatus receives the monitoring indicator corresponding to the device on the access path of the first data flow.

The configuration apparatus determines the key device in the devices on the access path by using the monitoring indicator corresponding to each device on the access path of the first data flow. Specifically, if there are a plurality of types of content of the monitoring indicator, the configuration apparatus may weight the plurality of types of content to obtain a weighted value, and determine a device to which a monitoring indicator with a maximum weighted value belongs as the key device. For example, the monitoring indicator includes CPU usage, memory usage, a packet loss ratio, and a transmission latency. Weight values corresponding to the CPU usage, the memory usage, the packet loss ratio, and the transmission latency are respectively a, b, c, and d, and the sum of a, b, c, and d is 1. A weighted value of the monitoring indicator is as follows: a×CPU usage+b× memory usage+c×packet loss ratio+d×transmission latency, where × indicates multiplication. There are three devices on the access path. A weighted value of a monitoring indicator of a device 1 on the access path is 0.8, a weighted value of a monitoring indicator of a device 2 on the access path is 0.9, and a weighted value of a monitoring indicator of a device 3 on the access path is 0.6. The configuration apparatus may determine the device 2 on the access path as the key device.

In addition, a threshold may be set. When a weighted value of a monitoring indicator of any device on the access path exceeds the threshold, the configuration apparatus may determine the device to which the weighted value of the monitoring indicator greater than the threshold belongs as the key device. When the weighted value of the monitoring indicator of each device on the access path does not exceed the threshold, the configuration apparatus directly determines a device with a largest weighted value of a monitoring indicator as the key device.

After determining the key device, the configuration apparatus determines a minimum requirement of each indicator in the QoS policy matching the first data flow. For example, when the QoS policy includes a network bandwidth requirement, a network bandwidth range is 100 M to 200 M, and a minimum requirement of the network bandwidth requirement is not less than 100 M. When the QoS policy includes a packet loss requirement, a packet loss ratio cannot exceed 10%, and a minimum requirement of the packet loss requirement is that the packet loss ratio cannot exceed 10%.

The configuration apparatus may obtain the QoS sub-policy of the key device based on the minimum requirement of each indicator in the QoS policy matching the first data flow. Specifically, the minimum requirement may be improved according to a specific algorithm. For example, the minimum requirement of the network bandwidth requirement in the QoS policy matching the first data flow is not less than 100 M, and a minimum requirement of a network bandwidth requirement in the QoS sub-policy of the first data flow that corresponds to the key device is not less than 120 M, or the like. For another example, a minimum requirement of a packet loss requirement in the QoS policy matching the first data flow is that a packet loss ratio cannot exceed 8%, and a minimum requirement of a packet loss requirement in the QoS sub-policy of the first data flow that corresponds to the key device is that a packet loss ratio cannot exceed 7%, or the like.

For other devices other than the key device on the access path of the first data flow, the configuration apparatus may determine the QoS policy matching the first data flow as a QoS sub-policy of each of the other devices.

Implementation 2: The configuration apparatus may determine the QoS policy matching the first data flow as a QoS sub-policy of each device on the access path of the first data flow.

Step 6042: The configuration apparatus configures each device on the access path based on a QoS sub-policy corresponding to the device.

In this embodiment, after determining the QoS sub-policy of each device on the access path of the first data flow, the configuration apparatus sends, to any device on the access path, the identifier of the first data flow and the QoS sub-policy corresponding to the device. Specifically, the identifier of the first data flow may be 5-tuple information of the first data flow, or a value (for example, a hash value after hash processing) that is uniquely obtained after the 5-tuple information of the first data flow is processed.

After receiving the identifier of the first data flow and the QoS sub-policy corresponding to the device, the device may add the identifier of the first data flow and the QoS sub-policy corresponding to the device to a correspondence between identifiers of data flows and QoS policies. Subsequently, each time a device on the access path of the first data flow receives a data flow, the device may identify an identifier of the data flow. If a QoS policy corresponding to the identifier of the data flow can be found in the stored correspondence between the identifiers of the data flows and the QoS policies, the data flow is processed by using the QoS policy.

In addition, in this embodiment, the QoS policy matching the first data flow is determined based on the first data flow. Therefore, a device that forwards the data flow of the service for the first time does not configure the QoS policy matching the first data flow, the configuration apparatus may deliver a preset QoS policy to each device that forwards the data flow of the service for the first time, and each device stores the preset QoS policy. In this way, when receiving the first data flow, the device that forwards the first data flow for the first time may obtain the preset QoS policy to process the first data flow because the QoS policy corresponding to the identifier of the first data flow is not found in the stored correspondence between the identifiers of the data flows and the QoS policies.

It should be noted herein that, corresponding to a concept of the QoS policy, if the QoS policy includes the network bandwidth requirement for the service, the latency requirement for the service, or the packet loss requirement for the service, the requirements are requirements for each device on the access path, rather than cumulative requirements for all the devices on the access path. For example, if a latency of the data flow of the service is 2 ms, a requirement for each device on the access path is 2 ms.

In an example implementation, in the data center, the virtual machine on the host is frequently migrated. In this case, the service on the virtual machine is accordingly migrated, and the host to which the virtual machine belongs does not transmit the data flow of the service. Therefore, the devices on the access path of the data flow may be enabled to delete an original QoS sub-policy matching the data flow. Processing performed by the configuration apparatus may be as follows:

The configuration apparatus obtains a disappearance message that is of the first data flow and sent by the virtual switch, or determines, based on 5-tuple information of data flow forwarded by the virtual switch, that the data flow forwarded by the virtual switch does not include the first data flow. The configuration apparatus cancels configuration of the devices on the access path based on the matched QoS policy.

In this embodiment, the configuration apparatus may determine, in two manners, that the data flow forwarded by the virtual switch does not include the first data flow.

Manner 1: A flow table corresponding to the first data flow is established on the virtual switch, and each time a data packet of the first data flow is transmitted, time of the flow table corresponding to the first data flow is updated. The virtual switch may determine the last update time of the flow table corresponding to the first data flow, and then determine duration from the last update time to a current time point. The virtual switch compares the duration with first preset duration (the first preset duration is used to indicate that a possibility of receiving the first data flow in a subsequent period of time is very low). If the duration is greater than the first preset duration, it may be determined that the first data flow disappears. The virtual switch may send the disappearance message of the first data flow to the service identification engine of the configuration apparatus, where the disappearance message carries the identifier of the first data flow, for example, the 5-tuple information of the first data flow. After receiving the disappearance message of the first data flow, the service identification engine of the configuration apparatus may obtain the identifier of the first data flow by parsing the disappearance message, and may determine that the data flow forwarded by the virtual switch does not include the first data flow.

Manner 2: The service identification engine records each time point at which the service identification engine receives a data flow. If duration from the last receiving time of the first data flow to a current time point exceeds second preset duration (the second preset duration is used to indicate that a possibility of receiving the first data flow in a subsequent period of time is very low), it is determined that the data flow forwarded by the virtual switch does not include the first data flow. It should be noted herein that Manner 2 is only applicable to a processing manner in which the virtual switch sends each data packet of the first data flow to the service identification engine.

When the configuration apparatus determines that the data flow forwarded by the virtual switch does not include the first data flow, the configuration apparatus may send a configuration cancellation notification to the devices on the access path of the first data flow, where the configuration cancellation notification carries the identifier of the first data flow. When receiving the configuration cancellation notification, the devices on the access path of the first data flow may delete, from the correspondence between the identifiers of the data flows and the QoS policies, the QoS policy corresponding to the identifier of the first data flow.

In this way, the QoS policy in the devices on the access path of the first data flow can be cleared in a timely manner, to reduce memory occupation.

In an example implementation, in the procedure shown in FIG. 6, the first data flow is a newly added data flow, and a manner of identifying that the first data flow is a newly added data flow may be as follows:

The configuration apparatus obtains an addition message that is of the first data flow and sent by the virtual switch, or determines, based on 5-tuple information of a data flow forwarded by the virtual switch, that the first data flow is added to the original data flow forwarded by the virtual switch.

In this embodiment, a flow table corresponding to the data flow is established on the virtual switch. When receiving the first data flow, the virtual switch determines whether the flow table corresponding to the first data flow is stored. If no flow table corresponding to the first data flow is stored, the virtual switch establishes the flow table corresponding to the first data flow, and corresponds the flow table to current time. The virtual switch may send the addition message of the first data flow to the service identification engine, where the addition message carries the identifier of the first data flow, for example, the 5-tuple information of the first data flow. After receiving the addition message of the first data flow, the configuration apparatus may obtain the identifier of the first data flow by parsing the addition message, and may determine that the first data flow is newly added to the virtual switch.

Alternatively, the service identification engine records an identifier of each data flow received by the service identification engine. If the service identifier of the first data flow does not belong to an identifier of the previously received data flow, it is determined that the first data flow is a newly added data flow.

Subsequently, the configuration device may obtain the first data flow, and perform the procedure in step 602 to step 604.

In this way, a newly added data flow can be identified in time, and a QoS policy can be configured for the newly added data flow.

In an example implementation, in a transmission process of the first data flow, the QoS policy matching the first data flow may need to be adjusted. The configuration apparatus may determine an adjusted QoS policy matching the first data flow, and configure (the configuration process is the same as the preceding configuration process) devices on the access path of the first data flow based on the adjusted QoS policy matching the first data flow.

In an example implementation, when the network topology of the host to which the virtual switch belongs changes, the configuration apparatus may determine, based on a current network topology and the source end and the destination end of the first data flow, whether the access path of the first data flow changes. If the access path of the first data flow does not change, the configuration apparatus does not perform any processing. If the access path of the first data flow changes, the configuration apparatus determines that devices on a changed access path do not belong to the devices on the original access path. The configuration apparatus configures the devices based on the QoS policy matching the first data flow. In this way, when the first data flow is transmitted on the devices, the first data flow is also processed based on the QoS policy matching the first data flow. In addition, the configuration apparatus may cancel, based on the QoS policy matching the first data flow, configuration of devices that no longer transmits the first data flow.

In an example implementation, the configuration apparatus further stores a correspondence between the service types and service levels. In the correspondence, for any two service types, when data flows of the two service types are transmitted in queuing, a data flow of a service type of a high service level is transmitted preferentially over a data flow of a service type of a low service level. After determining the service type of the first data flow, the configuration apparatus may determine, from the correspondence between the service types and the service levels, a service level corresponding to the service type of the first data flow. The configuration apparatus may deliver the service level and the identifier of the first data flow to the devices on the access path of the first data flow. The devices on the access path of the first data flow may correspondingly add the identifier and the service level of the first data flow to a correspondence between the identifiers of the data flows and the service levels. In this way, subsequently, the devices on the access path of the first data flow may forward the data flow based on the service level.

In this embodiment of this application, it should be noted that the first data flow is a general reference, and the foregoing manner may be used for all data flows.

Figure 8:
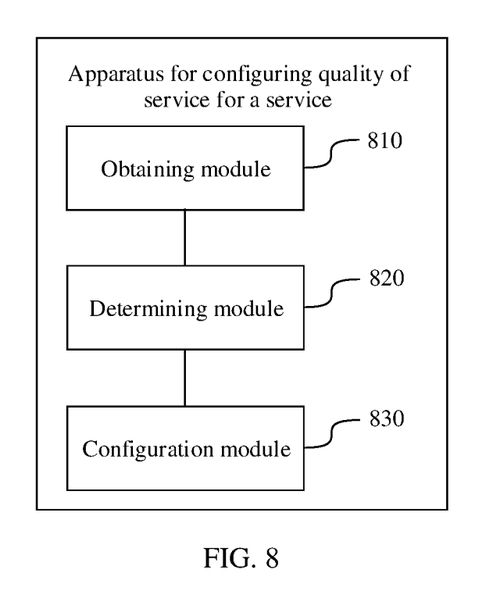
FIG. 8 is a schematic diagram of a structure of an apparatus for configuring a quality of service policy for a service according to an embodiment of this application.

FIG. 8 is a diagram of a structure of an apparatus for configuring a quality of service policy for a service according to an embodiment of this application. The apparatus may be implemented as a part of the apparatus or the entire apparatus by using software, hardware, or a combination thereof. The apparatus provided in this embodiment of this application may implement the procedure in FIG. 6 in this embodiment of this application. The apparatus includes an obtaining module 810, a determining module 820, and a configuration module 830.

The obtaining module 810 is configured to obtain a first data flow forwarded by a virtual switch, and may be specifically configured to implement an obtaining function in step 601 and an implicit step included in step 601.

The determining module 820 is configured to:
determine service information of the first data flow, where the service information includes a service type of the first data flow and an access path of the first data flow; and
determine, based on the service information of the first data flow, a quality of service QoS policy matching the first data flow. The determining module 820 may be specifically configured to implement determining functions in step 602 and step 603 and implicit steps included in step 602 and step 603.

The configuration module 830 is configured to configure devices on the access path based on the matched QoS policy, and may be specifically configured to implement a determining function in step 604 and an implicit step included in step 604.

In an example implementation, the determining module 820 is configured to:
determine a source identifier and a destination identifier of the first data flow based on 5-tuple information in the first data flow; and
determine the access path of the first data flow based on a stored network topology of a host to which the virtual switch belongs, the source identifier, and the destination identifier.

In an example implementation, the determining module 820 is configured to:
determine, based on a stored correspondence between service types and service level agreements SLAs, an SLA corresponding to the service type of the first data flow; and determine, based on the SLA corresponding to the service type, the QoS policy matching the first data flow.

In an example implementation, the configuration module 830 is configured to:

determine, based on the matched QoS policy, a QoS sub-policy corresponding to each device on the access path; and configure each device on the access path based on the QoS sub-policy corresponding to the device.

In an example implementation, the configuration module 830 is configured to:

obtain a monitoring indicator of each device on the access path, where the monitoring indicator includes one or more of central processing unit CPU usage, memory usage, a packet loss ratio, and a transmission latency;

determine a key device in the devices on the access path based on the monitoring indicator of each device, where the key device is a device that processes a data flow slowest on the access path;

determine a QoS sub-policy of the key device based on a minimum requirement of each indicator in the matched QoS policy; and determine the matched QoS policy as a QoS sub-policy of a device other than the key device on the access path.

In an example implementation, the determining module 820 is further configured to:

obtain a disappearance message that is of the first data flow and sent by the virtual switch, or determine, based on 5-tuple information of a data flow forwarded by the virtual switch, that the data flow forwarded by the virtual switch does not include the first data flow.

The configuration module 830 is further configured to:

cancel configuration of the devices on the access path based on the matched QoS policy.

In an example implementation, the determining module 820 is further configured to:

obtain an addition message that is of the first data flow and sent by the virtual switch, or determine, based on the 5-tuple information of the data flow forwarded by the virtual switch, that the first data flow is added to the original data flow forwarded by the virtual switch.

In this embodiment of this application, the configuration apparatus may determine, based on the data flow, an access path and a QoS policy that matches the data flow. Then, the configuration apparatus configures the devices on the access path based on the QoS policy matching the data flow. In this way, for any service, devices on an access path can be configured in this manner without manual configuration. Therefore, efficiency of configuring a QoS policy for the service can be improved.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

It should be noted that, when the apparatus for configuring a quality of service policy for a service provided in the foregoing embodiment configures the quality of service policy for the service, division of the foregoing functional modules is merely used as an example for description. In actual application, the foregoing functions may be allocated to different functional modules for implementation based on a requirement. That is, an internal structure of the apparatus is divided into different function modules, to implement all or some of the functions described above. In addition, the apparatus for configuring a quality of service policy for a service provided in the foregoing embodiment belongs to a same concept as the embodiments of the method for configuring a quality of service policy for a service. For a specific implementation process, refer to the method embodiment.

Figure 9:
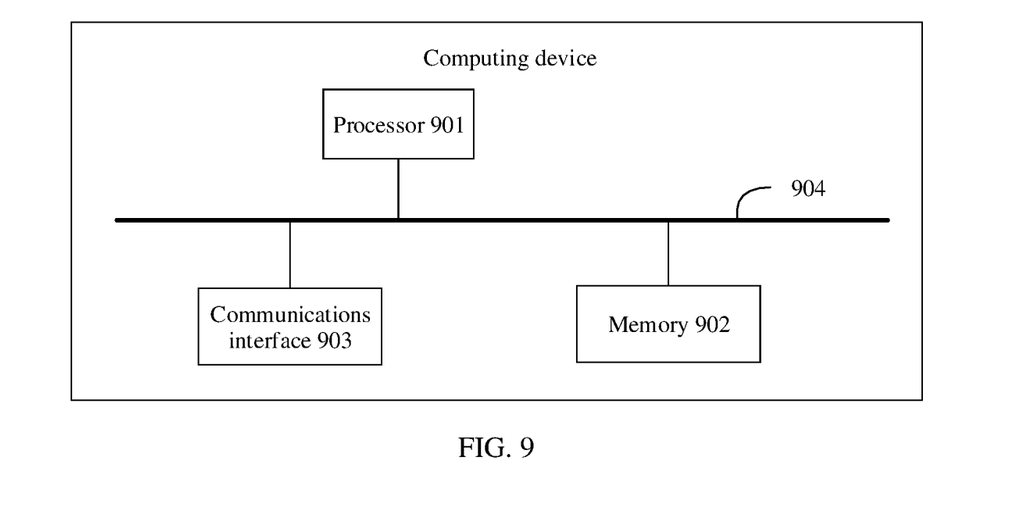
FIG. 9 is a schematic diagram of a structure of a computing device according to an embodiment of this application.

FIG. 9 provides an example of an example diagram of an architecture of a computing device according to this application. The computing device may include a processor 901, a memory 902, a communications interface 903, and a bus 904. On the computing device, there may be one or more processors 901. FIG. 9 shows only one of the processors 901. Optionally, the processor 901 may be a CPU. If the computing device includes a plurality of processors 901, the plurality of processors 901 may be of a same type or different types. Optionally, the plurality of processors of the computing device may be integrated into a multi-core processor.

The memory 902 stores computer instructions and data, and the memory 902 may store computer instructions and data that are required for implementing the method for configuring a quality of service policy for a service provided in this application. The memory 902 may be any one or any combination of the following storage media: a non-volatile memory (for example, a read-only memory (ROM), a solid state drive (SSD), a hard disk drive (HDD), an optical disc) or a volatile memory.

The communications interface 903 may be any one or any combination of the following components with a network access function, such as a network interface (for example, an Ethernet interface) and a wireless network interface card.

The communications interface 903 is configured to perform data communication between the computing device and another node or a terminal device.

FIG. 9 shows the bus 904 as an example. The processor 901, the memory 902, and the communications interface 903 may be connected by using the bus 904. In this way, by using the bus 904, the processor 901 may access the memory 902, and may further exchange data with another computing device or terminal device through the communications interface 903.

In this application, the computing device executes the computer instructions in the memory 902, and implements, by using the computing device, the method for providing a network service for a service provided in this application. For example, the computing device is enabled to perform the steps performed by the configuration module in the foregoing method for configuring a quality of service policy for a service.

All or some of the foregoing embodiments may be implemented by using software, hardware, firmware, or any combination thereof. When implemented by using software, all or some of the foregoing embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

What is claimed is:

1. A method for configuring a quality of service policy for a service comprising a first data flow, wherein the method comprises:
   obtaining the first data flow forwarded by a virtual switch;
   determining service information of the first data flow, wherein the service information comprises a service type of the first data flow and an access path of the first data flow;
   determining, based on the service information of the first data flow, a quality of service (QoS) policy matching the first data flow;
   obtaining a respective monitoring indicator of each device of a plurality of devices on the access path, wherein each said respective monitoring indicator comprises one or more of central processing unit (CPU) usage, memory usage, a packet loss ratio, and a transmission latency;
   determining a key device in the plurality of devices on the access path based on the respective monitoring indicator of said each device, wherein the key device is a device of the plurality of devices that is determined as processing a data flow slowest on the access path;
   determining a respective corresponding QoS sub-policy of the key device based on a minimum requirement of each monitoring indicator in the QoS policy;
   determining the QoS policy as the respective corresponding QoS sub-policy of a device other than the key device on the access path; and
   configuring said each device based on the respective corresponding QoS sub-policy.

2. The method according to claim 1, wherein the determining service information of the first data flow comprises:
   determining a source identifier and a destination identifier of the first data flow based on information in the first data flow; and
   determining the access path of the first data flow based on a stored network topology of a host, the source identifier of the first data flow, and the destination identifier of the first data flow, wherein the host includes the virtual switch.

3. The method according to claim 1, wherein the determining, based on the service information of the first data flow, a QoS policy matching the first data flow comprises:
   determining, based on a stored correspondence between service types and service level agreements (SLAs), an SLA corresponding to the service type of the first data flow; and
   determining, based on the SLA, the QoS policy.

4. The method according to claim 1, wherein the method further comprises:
   obtaining a disappearance message that is associated with the first data flow and sent by the virtual switch, or determining, based on information in a data flow forwarded by the virtual switch, that the data flow forwarded by the virtual switch does not comprise the first data flow; and
   after the obtaining of the disappearance message or the determining that the data flow forwarded by the virtual switch does not comprise the first data flow, canceling configuration of the plurality of devices on the access path based on the QoS policy.

5. The method according to claim 1, wherein the method further comprises:
   obtaining an addition message that is associated with the first data flow and sent by the virtual switch, or determining, based on information in another data flow forwarded by the virtual switch, that the first data flow is added to said another data flow forwarded by the virtual switch.

6. An apparatus for configuring a quality of service policy for a service comprising a first data flow, wherein the apparatus comprises:
   a processor; and
   a memory storing instructions, wherein the instructions when executed by the processor cause the apparatus to:
   obtain the first data flow forwarded by a virtual switch;
   determine service information of the first data flow, wherein the service information comprises a service type of the first data flow and an access path of the first data flow; and
   determine, based on the service information of the first data flow, a quality of service (QOS) policy matching the first data flow;
   obtain a respective monitoring indicator of each device of a plurality of devices on the access path, wherein each said respective monitoring indicator comprises one or more of central processing unit (CPU) usage, memory usage, a packet loss ratio, and a transmission latency;
   determine a key device in the plurality of devices on the access path based on the respective monitoring indicator of said each device, wherein the key device is a device of the plurality of devices that is determined by the apparatus as processing a data flow slowest on the access path;
   determine a respective corresponding QoS sub-policy of the key device based on a minimum requirement of each monitoring indicator in the QoS policy;
   determine the QoS policy as the respective corresponding QoS sub-policy of a device other than the key device on the access path; and
   configure said each device based on the respective corresponding QoS sub-policy.

7. The apparatus according to claim 6, wherein the processor is further configured to execute instructions to cause the apparatus to:
   determine a source identifier and a destination identifier of the first data flow based on information in the first data flow; and
   determine the access path of the first data flow based on a stored network topology of a host, the source identifier of the first data flow, and the destination identifier of the first data flow, wherein the host includes the virtual switch.

8. The apparatus according to claim 6, wherein the processor is further configured to execute instructions to cause the apparatus to:
   determine, based on a stored correspondence between service types and service level agreements (SLAs), an SLA corresponding to the service type of the first data flow; and
   determine, based on the SLA, the QoS policy.

9. The apparatus according to claim 6, wherein the processor is further configured to execute instructions to cause the apparatus to:
obtain a disappearance message that is associated with the first data flow and sent by the virtual switch, or determine, based on information in a data flow forwarded by the virtual switch, that the data flow forwarded by the virtual switch does not comprise the first data flow; and
after the obtaining of the disappearance message or the determining that the data flow forwarded by the virtual switch does not comprise the first data flow, cancel configuration of the plurality of devices on the access path based on the QoS policy.

10. The apparatus according to claim 6, wherein the processor is further configured to execute instructions to cause the apparatus to:
obtain an addition message that is associated with the first data flow and sent by the virtual switch, or determine, based on information in another data flow forwarded by the virtual switch, that the first data flow is added to said another data flow forwarded by the virtual switch.

11. A non-transitory computer-readable storage medium having stored therein instructions that, when executed by a processor of an apparatus for configuring a quality of service policy for a service comprising a first data flow, causes the apparatus to perform operations comprising:
obtaining the first data flow forwarded by a virtual switch;
determining service information of the first data flow, wherein the service information comprises a service type of the first data flow and an access path of the first data flow; and
determining, based on the service information of the first data flow, a quality of service (QOS) policy matching the first data flow;
obtain a respective monitoring indicator of each device of a plurality of devices on the access path, wherein each said respective monitoring indicator comprises one or more of central processing unit (CPU) usage, memory usage, a packet loss ratio, and a transmission latency;
determine a key device in the plurality of devices on the access path based on the respective monitoring indicator of said each device, wherein the key device is a device of the plurality of devices that is determined by the apparatus as processing a data flow slowest on the access path;
determine a respective corresponding QoS sub-policy of the key device based on a minimum requirement of each monitoring indicator in the QoS policy;
determine the QoS policy as the respective corresponding QoS sub-policy of a device other than the key device on the access path; and
configure said each device based on the respective corresponding QoS sub-policy.

12. The non-transitory computer-readable storage medium according to claim 11, wherein the stored instructions, when executed by the processor, further causes the apparatus to:
determine a source identifier and a destination identifier of the first data flow based on information in the first data flow; and
determine the access path of the first data flow based on a stored network topology of a host, the source identifier of the first data flow, and the destination identifier of the first data flow, wherein the host includes the virtual switch.

13. The non-transitory computer-readable storage medium according to claim 11, wherein the stored instructions, when executed by the processor, further causes the apparatus to:
determine, based on a stored correspondence between service types and service level agreements (SLAs), an SLA corresponding to the service type of the first data flow; and
determine, based on the SLA, the QoS policy.

14. The non-transitory computer-readable storage medium according to claim 11, wherein the stored instructions, when executed by the processor, further causes the apparatus to:
obtain a disappearance message that is associated with the first data flow and sent by the virtual switch, or determine, based on information in a data flow forwarded by the virtual switch, that the data flow forwarded by the virtual switch does not comprise the first data flow; and
after the obtaining of the disappearance message or the determining that the data flow forwarded by the virtual switch does not comprise the first data flow, cancel configuration of the plurality of devices on the access path based on the QoS policy.

* * * * *